(12) United States Patent
Ro et al.

(10) Patent No.: US 9,160,929 B2
(45) Date of Patent: Oct. 13, 2015

(54) LINE-OF-SIGHT TRACKING SYSTEM AND METHOD

(71) Applicant: Hyundai Motor Company, Seoul (KR)

(72) Inventors: Hee Jin Ro, Seoul (KR); Seok Beom Lee, Seoul (KR); Dong Hee Seok, Seoul (KR); Sung Min Park, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 245 days.

(21) Appl. No.: 13/871,678

(22) Filed: Apr. 26, 2013

(65) Prior Publication Data
US 2014/0160249 A1    Jun. 12, 2014

(30) Foreign Application Priority Data

Dec. 11, 2012  (KR) .................. 10-2012-0143921

(51) Int. Cl.
*H04N 7/18* (2006.01)
*H04N 5/232* (2006.01)
*G06T 7/00* (2006.01)
*G06K 9/00* (2006.01)

(52) U.S. Cl.
CPC ........ *H04N 5/23296* (2013.01); *G06K 9/00604* (2013.01); *G06K 9/00845* (2013.01); *G06T 7/004* (2013.01); *G06T 7/0075* (2013.01); *G06T 2207/10012* (2013.01); *G06T 2207/10021* (2013.01); *G06T 2207/30201* (2013.01)

(58) Field of Classification Search
CPC .................. B60R 21/01538; G02B 2027/014; G02B 2027/0138; G02B 2027/0187; G02B 2027/0134; H04N 5/23296
See application file for complete search history.

(56) References Cited

U.S. PATENT DOCUMENTS

| | | | | |
|---|---|---|---|---|
| 2004/0239509 | A1* | 12/2004 | Kisacanin et al. | 340/575 |
| 2008/0186449 | A1* | 8/2008 | Sur et al. | 351/210 |
| 2010/0013949 | A1* | 1/2010 | Miyamoto | 348/222.1 |
| 2010/0253594 | A1* | 10/2010 | Szczerba et al. | 345/7 |
| 2011/0169625 | A1* | 7/2011 | James et al. | 340/439 |
| 2011/0310001 | A1* | 12/2011 | Madau et al. | 345/156 |
| 2012/0154441 | A1* | 6/2012 | Kim | 345/633 |

FOREIGN PATENT DOCUMENTS

| | | | |
|---|---|---|---|
| JP | 2004254960 | A | 9/2004 |
| JP | 2004259043 | A | 9/2004 |
| JP | 2005278898 | A | 10/2005 |
| JP | 2010-281685 | A | 12/2010 |

(Continued)

*Primary Examiner* — Victor Kostak
(74) *Attorney, Agent, or Firm* — McDermott Will & Emery LLP

(57) ABSTRACT

A display system includes a line-of-sight tracking camera to detect an eyeball of a driver, first and second stereo cameras, a controlling unit, and a storing unit. The first and second stereo camera photographs a range corresponding to a field-of-view based on stereo camera-based line-of-sight information that is changed based on line-of-sight tracking camera-based line-of-sight information, and provide a photographed image. The controlling unit converts the line-of-sight tracking camera-based line-of-sight information into first and second stereo camera-based line-of-sight information based on pre-stored position and rotation information of the tracking camera and the first and second stereo cameras, and project the converted information onto the first and second stereo cameras, such that a three-dimensional line-of-sight coordinate is calculated. The storing unit stores information related to a system as well as the position and rotation information of the tracking camera and the first and second stereo cameras.

16 Claims, 6 Drawing Sheets

(56) References Cited

FOREIGN PATENT DOCUMENTS

| | | | |
|---|---|---|---|
| JP | 2012-177809 | A | 9/2012 |
| KR | 1020060105271 | A | 10/2006 |
| KR | 10-2009-0104607 | A | 10/2009 |
| KR | 10-2012-0055011 | A | 5/2012 |
| KR | 10-2012-0062541 | A | 6/2012 |

* cited by examiner

LINE-OF-SIGHT TRACKING SYSTEM AND METHOD

CROSS-REFERENCE TO RELATED APPLICATION

This application is based on and claims benefit of priority to Korean Patent Application No. 10-2012-0143921, filed on Dec. 11, 2012 in the Korean Intellectual Property Office, the entire contents of which are hereby incorporated by reference.

TECHNICAL FIELD

The present inventive concept relates to a display system and method.

BACKGROUND

Currently, as disclosed in Patent Document 1, various vehicle safety apparatuses for the convenience and safety of a vehicle driver have been developed.

More specifically, a line-of-sight tracking technology of securing a line-of-sight of a driver in a vehicle and using the secured line-of-sight to provide a real time front image of a road on which the vehicle is driven, an alarm service, and the like, has been provided.

However, the above-mentioned line-of-sight tracking technology has been mainly optimized in a two-dimensional (2D) environment, such as verification of efficiency of an advertisement, an interface utilizing a display, or the like, in which only a direction of a line-of-sight is detected.

Meanwhile, since the driver views an actual environment, e.g., 3D environment, with the naked eyes at the time of driving the vehicle, there is a limitation in accurately detecting a direction of a line-of-sight only with a line-of-sight vector detected in the 2D environment.

RELATED ART DOCUMENT

[Patent Document]
(Patent Document 1) KR 10-2011-0139474 A

SUMMARY

Accordingly, the present inventive concept has been made to solve the above-mentioned problems occurring in the prior art while advantages achieved by the prior art are maintained intact.

One aspect of the present inventive concept relates to a display system and method for detecting a three-dimensional based driver's line-of-sight coordinate. The display system includes a line-of-sight tracking camera configured to detect an eyeball of a driver. First and second stereo cameras are configured to photograph a range corresponding to a driver's field-of-view based on stereo camera-based driver's line-of-sight information changed from line-of-sight tracking camera-based driver's line-of-sight information and provide a photographed image. A controlling unit is configured to convert the line-of-sight tracking camera-based driver's line-of-sight information into first and second stereo camera-based driver's line-of-sight information based on pre-stored position information and rotation information of the line-of-sight tracking camera and the first and second stereo cameras and project the converted information onto the first and second stereo cameras, such that a three-dimensional coordinate of a driver's line-of-sight is calculated. A storing unit is configured to store information related to the display system as well as the position information and the rotation information of the line-of-sight tracking camera and the first and second stereo cameras.

The line-of-sight tracking camera-based driver's line-of-sight information may include a line-of-sight tracking vector monocular eye point and a line-of-sight tracking vector. The controlling unit may be configured to convert the line-of-sight tracking camera-based line-of-sight tracking vector monocular eye point into a stereo camera-based line-of-sight tracking vector monocular eye point.

The controlling unit may be configured to convert the line-of-sight tracking camera-based line-of-sight tracking vector monocular eye point (Location) $(x_{loc}^{eye}, y_{loc}^{eye}, z_{loc}^{eye}, 1)$ into a stereo camera-based line-of-sight tracking vector monocular eye point $(x_{loc}^{global}, y_{loc}^{global}, z_{loc}^{global}, 1)$ through the following Equation 1:

$$\text{Location} = \underbrace{\begin{bmatrix} 1 & 0 & 0 & t_{xzy}^x \\ 0 & 1 & 0 & t_{xyz}^y \\ 0 & 0 & 1 & t_{xyz}^z \\ 0 & 0 & 0 & 1 \end{bmatrix}}_{\text{Positive Movement}} \underbrace{\begin{bmatrix} 1 & 0 & 0 & 0 \\ 0 & \cos\theta_x & -\sin\theta_x & 0 \\ 0 & \sin\theta_x & \cos\theta_x & 0 \\ 0 & 0 & 0 & 1 \end{bmatrix}}_{X \text{ axis rotation}}$$

$$\underbrace{\begin{bmatrix} \cos\theta_y & 0 & -\sin\theta_y & 0 \\ 0 & 1 & 0 & 1 \\ \sin\theta_y & 0 & \cos\theta_y & 0 \\ 0 & 0 & 0 & 1 \end{bmatrix}}_{Y \text{ axis rotation}} \underbrace{\begin{bmatrix} \cos\theta_z & -\sin\theta_z & 0 & 0 \\ \sin\theta_z & \cos\theta_z & 0 & 0 \\ 0 & 0 & 1 & 0 \\ 0 & 0 & 0 & 1 \end{bmatrix}}_{Z \text{ axis rotation}} \begin{bmatrix} x_{loc}^{eye} \\ y_{loc}^{eye} \\ z_{loc}^{eye} \\ 1 \end{bmatrix}$$

where $t_{xyz}^x$, $t_{xyz}^y$, and $t_{xyz}^z$ mean position information, and $\theta_x$, $\theta_y$, $\theta_z$ mean rotation information.

The line-of-sight tracking camera-based driver's line-of-sight information may include a line-of-sight tracking vector monocular eye point and a line-of-sight tracking vector, and the controlling unit may convert the line-of-sight tracking camera-based line-of-sight tracking vector into a stereo camera-based line-of-sight tracking vector.

The controlling unit may be configured to convert the line-of-sight tracking camera-based line-of-sight tracking vector $(x_{vec}^{eye}, y_{vec}^{eye}, z_{vec}^{eye}, 1)$ into a stereo camera-based line-of-sight tracking vector (Rotation) $(x_{vec}^{global}, y_{vec}^{global}, z_{vec}^{global}, 1)$ through the following Equation 2:

$$\text{Rotation} = \underbrace{\begin{bmatrix} 1 & 0 & 0 & 0 \\ 0 & \cos\theta_x & -\sin\theta_x & 0 \\ 0 & \sin\theta_x & \cos\theta_x & 0 \\ 0 & 0 & 0 & 1 \end{bmatrix}}_{X \text{ axis rotation}}$$

$$\underbrace{\begin{bmatrix} \cos\theta_y & 0 & -\sin\theta_y & 0 \\ 0 & 1 & 0 & 0 \\ \sin\theta_y & 0 & \cos\theta_y & 0 \\ 0 & 0 & 0 & 1 \end{bmatrix}}_{Y \text{ axis rotation}} \underbrace{\begin{bmatrix} \cos\theta_z & -\sin\theta_z & 0 & 0 \\ \sin\theta_z & \cos\theta_z & 0 & 0 \\ 0 & 0 & 1 & 0 \\ 0 & 0 & 0 & 1 \end{bmatrix}}_{Z \text{ axis rotation}} \begin{bmatrix} x_{vec}^{eye} \\ y_{vec}^{eye} \\ z_{vec}^{eye} \\ 1 \end{bmatrix}$$

where $\theta_x$, $\theta_y$, $\theta_z$ mean rotation information.

The controlling unit may be configured to calculate a driver's line-of-sight gaze point from a stereo camera-based line-of-sight tracking vector projected onto the first and second stereo cameras and calculate the three-dimensional coordinate of the driver's line-of-sight based on the calculated driver's line-of-sight gaze point.

The controlling unit may be configured to generate a window corresponding to a preset main gaze range of a person's line-of-sight on an image projected onto the first stereo camera, move a monocular eye point of the generated window according to a first stereo camera-based line-of-sight tracking vector, perform template matching such that the moved window corresponds to a line-of-sight tracking vector of the second stereo camera, and recognize a highest position as a driver's line-of-sight gaze point as a result of the performing of the template matching.

The three-dimensional coordinate of driver's line-of-sight may be P(Xp, Yp, Zp), $$X_p = x_1 \frac{T}{d}, Y_p = y_1 \frac{T}{d}, \text{ and } Z_p = f \frac{T}{x_1 - x_r},$$

where $P_l(x_1, y_1)$ is a point at which P is projected onto an imaging surface of the first stereo camera, $P_r(x_r, y_r)$ is a point at which P is projected onto an imaging surface of the second stereo camera, f is a focal length of the camera, T is a distance between the first and second stereo cameras, and d is a value obtained by dividing a distance of a coordinate measuring point by the focal length of the camera.

Another aspect of the present inventive concept encompasses a display method providing a three-dimensional driver's line-of-sight in a display system including a line-of-sight tracking camera and first and second stereo cameras. The display method includes detecting an eyeball of a driver through the line-of-sight tracking camera to recognize line-of-sight tracking camera-based driver's line-of-sight information. The line-of-sight tracking camera-based driver's line-of-sight information is converted into first and second stereo camera-based driver's line-of-sight information based on pre-stored position information and rotation information of the line-of-sight tracking camera and the first and second stereo cameras. A driver's line-of-sight gaze point is recognized based on the first and second stereo camera-based driver's line-of-sight information. The driver's line-of-sight gaze point is converted into a three-dimensional coordinate of a driver's line-of-sight.

The line-of-sight tracking camera-based driver's line-of-sight information may include a line-of-sight tracking vector monocular eye point and a line-of-sight tracking vector. In the converting of the line-of-sight tracking camera-based driver's line-of-sight information into the first and second stereo camera-based driver's line-of-sight information, the line-of-sight tracking camera-based line-of-sight tracking vector monocular eye point may be converted into a stereo camera-based line-of-sight tracking vector monocular eye point.

In the converting of the line-of-sight tracking camera-based driver's line-of-sight information into the first and second stereo camera-based driver's line-of-sight information, the line-of-sight tracking camera-based line-of-sight tracking vector monocular eye point (Location) $(x_{loc}^{eye}, y_{loc}^{eye}, z_{loc}^{eye}, 1)$ may be converted into a stereo camera-based line-of-sight tracking vector monocular eye point $(x_{loc}^{global}, y_{loc}^{global}, z_{loc}^{global}, 1)$ through the following Equation 1:

$$\text{Location} = \underbrace{\begin{bmatrix} 1 & 0 & 0 & t_{xyz}^x \\ 0 & 1 & 0 & t_{xyz}^y \\ 0 & 0 & 1 & t_{xyz}^z \\ 0 & 0 & 0 & 1 \end{bmatrix}}_{\text{Position Movement}} \underbrace{\begin{bmatrix} 1 & 0 & 0 & 0 \\ 0 & \cos\theta_x & -\sin\theta_x & 0 \\ 0 & \sin\theta_x & \cos\theta_x & 0 \\ 0 & 0 & 0 & 1 \end{bmatrix}}_{X \text{ axis rotation}}$$

$$\underbrace{\begin{bmatrix} \cos\theta_y & 0 & -\sin\theta_y & 0 \\ 0 & 1 & 0 & 0 \\ \sin\theta_y & 0 & \cos\theta_y & 0 \\ 0 & 0 & 0 & 1 \end{bmatrix}}_{Y \text{ axis rotation}} \underbrace{\begin{bmatrix} \cos\theta_z & -\sin\theta_z & 0 & 0 \\ \sin\theta_z & \cos\theta_z & 0 & 0 \\ 0 & 0 & 1 & 0 \\ 0 & 0 & 0 & 1 \end{bmatrix}}_{Z \text{ axis rotation}} \begin{bmatrix} x_{loc}^{eye} \\ y_{loc}^{eye} \\ z_{loc}^{eye} \\ 1 \end{bmatrix}$$

where $t_{xyz}^x$, $t_{xyz}^y$, and $t_{xyz}^z$ mean position information, and $\theta_x$, $\theta_y$, $\theta_z$ mean rotation information.

The line-of-sight tracking camera-based driver's line-of-sight information may include a line-of-sight tracking vector monocular eye point and a line-of-sight tracking vector, and in the converting of the line-of-sight tracking camera-based driver's line-of-sight information into the first and second stereo camera-based driver's line-of-sight information, the line-of-sight tracking camera-based line-of-sight tracking vector may be converted into a stereo camera-based line-of-sight tracking vector.

In the converting of the line-of-sight tracking camera-based driver's line-of-sight information into the first and second stereo camera-based driver's line-of-sight information, the line-of-sight tracking camera-based line-of-sight tracking vector $(x_{vec}^{eye}, y_{vec}^{eye}, z_{vec}^{eye}, 1)$ may be converted into a stereo camera-based line-of-sight tracking vector (Rotation) $(x_{vec}^{global}, y_{vec}^{global}, z_{vec}^{global}, 1)$ through the following Equation 2:

$$\text{Rotation} = \underbrace{\begin{bmatrix} 1 & 0 & 0 & 0 \\ 0 & \cos\theta_x & -\sin\theta_x & 0 \\ 0 & \sin\theta_x & \cos\theta_x & 0 \\ 0 & 0 & 0 & 1 \end{bmatrix}}_{X \text{ axis rotation}}$$

$$\underbrace{\begin{bmatrix} \cos\theta_y & 0 & -\sin\theta_y & 0 \\ 0 & 1 & 0 & 0 \\ \sin\theta_y & 0 & \cos\theta_y & 0 \\ 0 & 0 & 0 & 1 \end{bmatrix}}_{Y \text{ axis rotation}} \underbrace{\begin{bmatrix} \cos\theta_z & -\sin\theta_z & 0 & 0 \\ \sin\theta_z & \cos\theta_z & 0 & 0 \\ 0 & 0 & 1 & 0 \\ 0 & 0 & 0 & 1 \end{bmatrix}}_{Z \text{ axis rotation}} \begin{bmatrix} x_{vec}^{eye} \\ y_{vec}^{eye} \\ z_{vec}^{eye} \\ 1 \end{bmatrix}$$

where $\theta_x$, $\theta_y$, $\theta_z$ mean rotation information.

In the recognizing of the driver's line-of-sight gaze point, the first and second stereo camera-based driver's line-of-sight information may be projected onto the first and second stereo cameras. The driver's line-of-sight gaze point may be recognized based on the information projected onto the first and second stereo cameras.

In the recognizing of the driver's line-of-sight gaze point based on the information projected onto the first and second stereo cameras, a window corresponding to a preset main gaze range of a person's line-of-sight may be generated on an image projected onto the first stereo camera. A monocular eye point of the generated window may be moved according to a first stereo camera-based line-of-sight tracking vector. Template matching may be performed such that the moved window corresponds to a line-of-sight tracking vector of the second stereo camera. A highest position may be recognized as a driver's line-of-sight gaze point as a result of the performance.

The three-dimensional coordinate of the driver's line-of-sight may be P(Xp, Yp, Zp), $$X_p = x_1 \frac{T}{d}, Y_p = y_1 \frac{T}{d}, \text{ and } Z_p = f \frac{T}{x_1 - x_r},$$

where $P_1(x_1, y_1)$ is a point at which P is projected onto an imaging surface of the first stereo camera, $P_r(x_r, y_r)$ is a point at which P is projected onto an imaging surface of the second stereo camera, f is a focal length of the camera, T is a distance between the first and second stereo cameras, and d is a value obtained by dividing a distance of a coordinate measuring point by the focal length of the camera.

Various features and advantages of the present inventive concept will be more obvious from the following description with reference to the accompanying drawings.

The terms and words used in the present specification and claims should not be interpreted as being limited to typical meanings or dictionary definitions, but should be interpreted as having meanings and concepts relevant to the technical scope of the present inventive concept based on the rule according to which an inventor can appropriately define the concept of the term to describe most appropriately the best method he or she knows for carrying out the inventive concept.

BRIEF DESCRIPTION OF THE DRAWINGS

The foregoing and other features of the inventive concept will be apparent from a more particular description of embodiments of the inventive concept, as illustrated in the accompanying drawings in which like reference characters may refer to the same or similar parts throughout the different views. The drawings are not necessarily to scale, emphasis instead being placed upon illustrating the principles of the embodiments of the inventive concept.

DETAILED DESCRIPTION

Figure 1:
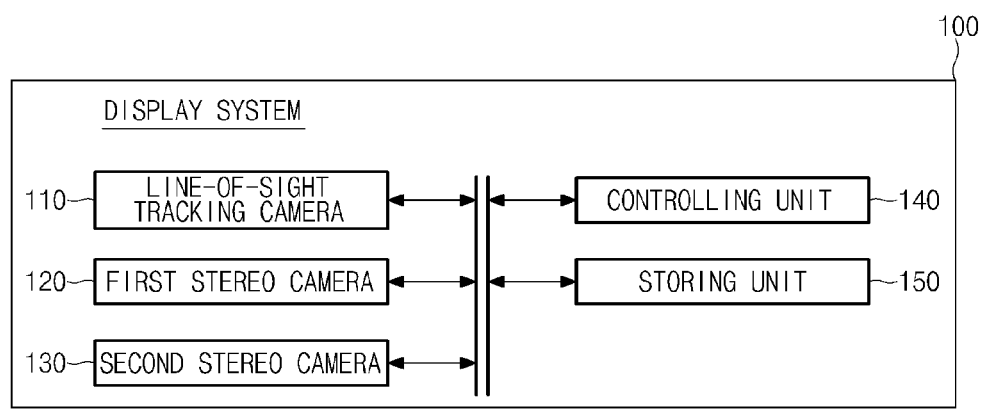
FIG. 1 is a view showing a configuration of a display system according to an exemplary embodiment of the present inventive concept.

The above and other objects, features and advantages of the present inventive concept will be more clearly understood from the following detailed description taken in conjunction with the accompanying drawings. In the specification, in adding reference numerals to components throughout the drawings, it is to be noted that like reference numerals designate like components even though components are shown in different drawings. Further, when it is determined that the detailed description of the known art related to the present inventive concept may obscure the gist of the present inventive concept, the detailed description thereof will be omitted. Hereinafter, exemplary embodiments of the present inventive concept will be described in detail with reference to the accompanying drawings.

FIG. 1 is a view showing a configuration of a display system according to an exemplary embodiment of the present inventive concept. The display system will be described with reference to FIGS. 3 to 6 showing an example for describing a display method.

As shown in FIG. 1, a display system 100 may be configured to include a line-of-sight tracking camera 110, a first stereo camera 120, a second stereo camera 130, a controlling unit 140, and a storing unit 150.

More specifically, the line-of-sight tracking camera 110 may detect an eyeball of a driver in a vehicle.

Figure 3:
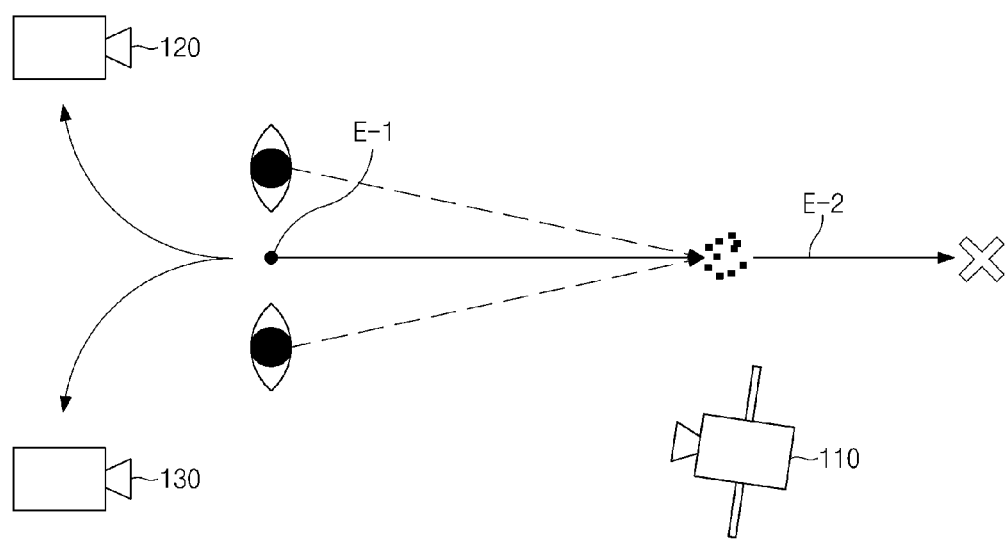
FIGS. 3 to 6 are views showing an example for describing a display method according to the exemplary embodiment of the present inventive concept.
Figure 4:
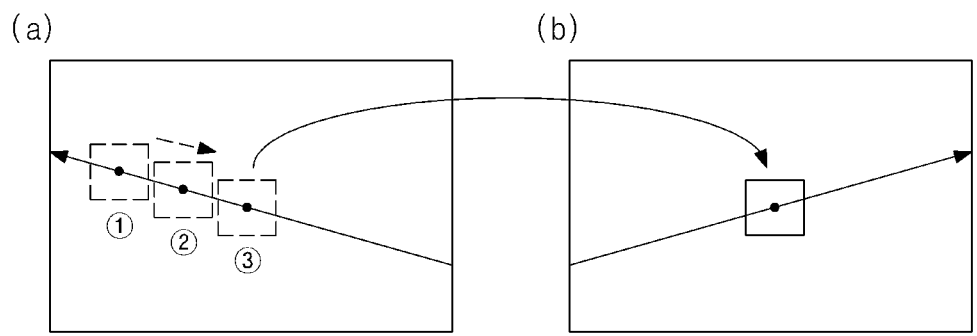

As shown in FIG. 3, the line-of-sight tracking camera 110 may be disposed at a position at which the line-of-sight tracking camera 110 may detect a face of the driver in the vehicle to detect the eyeball of the driver.

The first and second stereo cameras 120 and 130 may photograph a range corresponding to a driver's field-of-view based on stereo camera-based driver's line-of-sight information and provide a photographed image. The stereo camera-based driver's line-of-sight information may be changed based on line-of-sight tracking camera-based driver's line-of-sight information.

As shown in FIG. 3, the first and second stereo cameras 120 and 130 may be disposed such that the first and second stereo cameras 120 and 130 are spaced apart from each other so as to correspond to each other at respective sides with respect to the driver.

In addition, the first and second stereo cameras 120 and 130 may share internal parameters (a focal length, a principal point, skew, and distortion) and/or external parameters (rotation and translation) with each other, such that it is possible to restore a single position to a three-dimensional position.

The controlling unit 140 may convert the line-of-sight tracking camera-based driver's line-of-sight information into first and second stereo camera-based driver's line-of-sight information based on pre-stored position information and rotation information of the line-of-sight tracking camera 110 and the first and second stereo cameras 120 and 130. The controlling unit 140 may project the converted information onto the first and second stereo cameras 120 and 130, thereby calculating a three-dimensional coordinate of the driver's line-of-sight.

Here, the line-of-sight tracking camera-based driver's line-of-sight information may include a line-of-sight tracking vector monocular eye point E-1 (see FIG. 3) and a line-of-sight tracking vector E-2 (see FIG. 3).

More specifically, the controlling unit 140 may convert the line-of-sight tracking camera-based line-of-sight tracking vector monocular eye point (Location) $(x_{loc}^{eye}, y_{loc}^{eye}, z_{loc}^{eye}, 1)$ into a stereo camera-based line-of-sight tracking vector monocular eye point $(x_{loc}^{global}, y_{loc}^{global}, z_{loc}^{global}, 1)$ through the following Equation 1.

$$\text{Location} = \underbrace{\begin{bmatrix} 1 & 0 & 0 & t_{xyz}^x \\ 0 & 1 & 0 & t_{xyz}^y \\ 0 & 0 & 1 & t_{xyz}^z \\ 0 & 0 & 0 & 1 \end{bmatrix}}_{\text{Position Movement}} \underbrace{\begin{bmatrix} 1 & 0 & 0 & 0 \\ 0 & \cos\theta_x & -\sin\theta_x & 0 \\ 0 & \sin\theta_x & \cos\theta_x & 0 \\ 0 & 0 & 0 & 1 \end{bmatrix}}_{X \text{ axis rotation}} \quad \text{[Equation 1]}$$

-continued $$\underbrace{\begin{bmatrix} \cos\theta_y & 0 & -\sin\theta_y & 0 \\ 0 & 1 & 0 & 0 \\ \sin\theta_y & 0 & \cos\theta_y & 0 \\ 0 & 0 & 0 & 1 \end{bmatrix}}_{Y \text{ axis rotation}} \underbrace{\begin{bmatrix} \cos\theta_z & -\sin\theta_z & 0 & 0 \\ \sin\theta_z & \cos\theta_z & 0 & 0 \\ 0 & 0 & 1 & 0 \\ 0 & 0 & 0 & 1 \end{bmatrix}}_{Z \text{ axis rotation}} \begin{bmatrix} x_{loc}^{eye} \\ y_{loc}^{eye} \\ z_{loc}^{eye} \\ 1 \end{bmatrix}$$

In Equation 1, $t_{xyz}^x$, $t_{xyz}^y$, and $t_{xyz}^z$ mean position information, and $\theta_x$, $\theta_y$, $\theta_z$ may mean rotation information.

Further, in Equation 1, first to fourth matrix groups mean position movement, x axis rotation, y axis rotation, and z axis rotation, respectively.

In addition, the controlling unit 140 may convert the line-of-sight tracking camera-based line-of-sight tracking vector $(x_{vec}^{eye}, y_{vec}^{eye}, z_{vec}^{eye}, 1)$ into a stereo camera-based line-of-sight tracking vector (Rotation) $(x_{vec}^{global}, y_{vec}^{global}, z_{vec}^{global}, 1)$ through the following Equation 2.

$$\text{Rotation} = \underbrace{\begin{bmatrix} 1 & 0 & 0 & 0 \\ 0 & \cos\theta_x & -\sin\theta_x & 0 \\ 0 & \sin\theta_x & \cos\theta_x & 0 \\ 0 & 0 & 0 & 1 \end{bmatrix}}_{X \text{ axis rotation}} \quad \text{[Equation 2]}$$

$$\underbrace{\begin{bmatrix} \cos\theta_y & 0 & -\sin\theta_y & 0 \\ 0 & 1 & 0 & 0 \\ \sin\theta_y & 0 & \cos\theta_y & 0 \\ 0 & 0 & 0 & 1 \end{bmatrix}}_{Y \text{ axis rotation}} \underbrace{\begin{bmatrix} \cos\theta_z & -\sin\theta_z & 0 & 0 \\ \sin\theta_z & \cos\theta_z & 0 & 0 \\ 0 & 0 & 1 & 0 \\ 0 & 0 & 0 & 1 \end{bmatrix}}_{Z \text{ axis rotation}} \begin{bmatrix} x_{vec}^{eye} \\ y_{vec}^{eye} \\ z_{vec}^{eye} \\ 1 \end{bmatrix}$$

$\theta_x$, $\theta_y$, $\theta_z$ may mean rotation information.

Further, in Equation 2, first to third matrix groups mean x axis rotation, y axis rotation, and z axis rotation, respectively.

In addition, the controlling unit 140 may calculate a driver's line-of-sight gaze point from the stereo camera-based line-of-sight tracking vector projected onto the first and second stereo cameras 120 and 130 and calculate the three-dimensional coordinate of driver's line-of-sight based on the calculated driver's line-of-sight gaze point.

More specifically, the controlling unit 140 may generate a window corresponding to a preset main gaze range (for example, about ±3 to 5 degrees) of a person's line-of-sight, on an image projected onto the first stereo camera 120 and move a monocular eye point of the generated window according to a first stereo camera-based line-of-sight tracking vector.

That is, an image most similar to the stereo camera-based line-of-sight tracking vector projected onto the first and second stereo cameras 120 and 130 may be recognized as a focus of the line-of-sight.

Although the case in which the stereo camera-based line-of-sight tracking vector is projected onto the first stereo camera 120 has been described above, the present inventive concept is not limited thereto. That is, the stereo camera-based line-of-sight tracking vector may also be projected onto the second stereo camera 130.

For example, FIG. 4A shows a stereo camera-based line-of-sight tracking vector projected onto the first stereo camera 120. FIG. 4B shows a stereo camera-based line-of-sight tracking vector projected onto the second stereo camera 130.

Here, the controlling unit 140 may move a monocular eye point of the window projected onto the first stereo camera 120 from ① to ③ through ② according to the first stereo camera-based line-of-sight tracking vector.

In addition, the controlling unit 140 may perform template matching such that the moved window corresponds to a line-of-sight tracking vector of the second stereo camera 130 and recognize the highest position as a driver's line-of-sight gaze point as a result of the performance.

Here, the template matching means a process of extracting a given figure that coincides with a template from an image by means of a figure recognizing process, thereby finding the highest peak point in a cross-correlation scheme.

For example, as shown in FIG. 4B, the controlling unit 140 may perform the template matching such that the moved window corresponds to the line-of-sight tracking vector of the second stereo camera 130.

Further, the controlling unit 140 may calculate the three-dimensional coordinate of the driver's line-of-sight. In this case, the three-dimensional coordinate of the driver's line-of-sight may be P(Xp, Yp, Zp).

Figure 5:
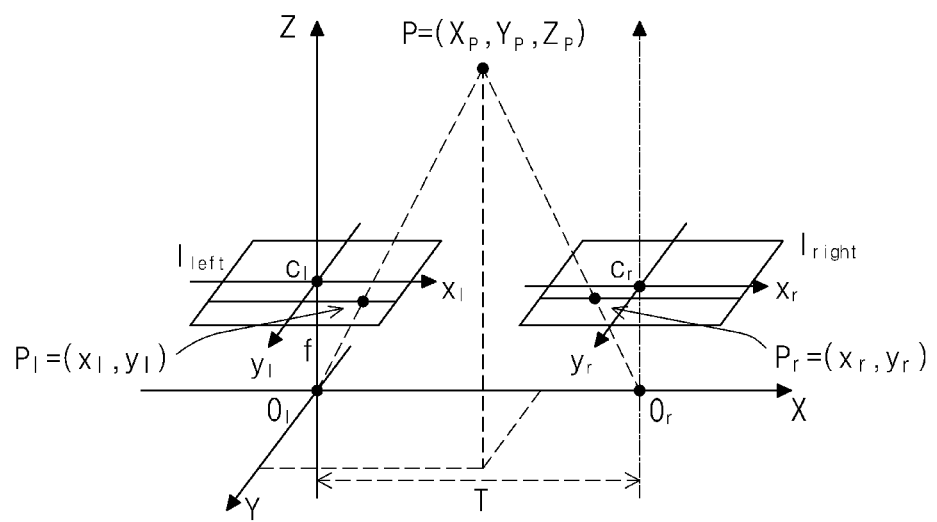

Referring to FIG. 5, the three-dimensional coordinate of the driver's line-of-sight may be (P(Xp, Yp, Zp)), $$X_p = x_1 \frac{T}{d}, Y_p = y_1 \frac{T}{d}, \text{ and } Z_p = f \frac{T}{x_1 - x_r}.$$

Here, $P_1(x_1, y_1)$ may be a point at which P is projected onto an imaging surface of the first stereo camera. $P_r(x_r, y_r)$ may be a point at which P is projected onto an imaging surface of the second stereo camera. f may be a focal length of the camera. T may be a distance between the first and second stereo cameras. d may be a value (d=$Z_p$/f) obtained by dividing a distance of a coordinate measuring point by the focal distance of the camera.

Further, in FIG. 5, $I_{left}$ means an imaging surface of the first stereo camera (left camera) 120. $I_{right}$ means an imaging surface of the second stereo camera (right camera) 130. $C_l$ means an image monocular eye point of the first stereo camera. $C_r$ means an image monocular eye point of the second stereo camera. $O_l$ means a focal point of the first stereo camera. $O_r$ means a focal point of the second stereo camera.

Meanwhile, the three-dimensional coordinate of the driver's line-of-sight may be applied as a user interface for a vehicle.

Figure 6:
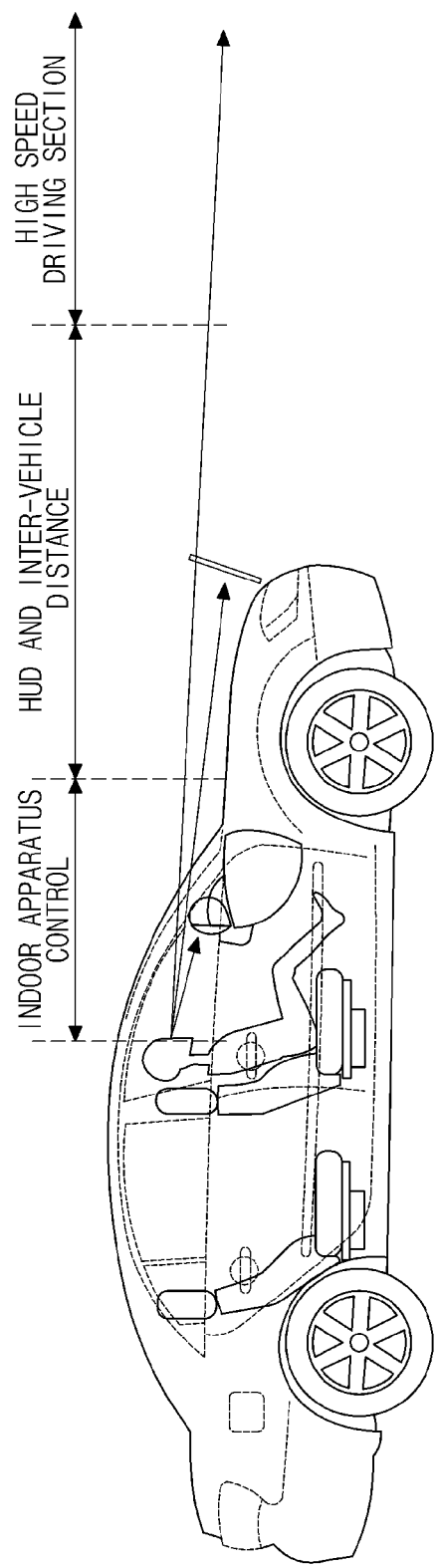

For example, as shown in FIG. 6, the three-dimensional coordinate of the driver's line-of-sight may be applied to a turn-on or turn-off service of a head up display (HUD). The three-dimensional coordinate of the driver's line-of-sight may be used in a manner that the service is driven, when a focal length is present in a HUD area, to change alarm strength according to a line-of-sight distance when a front vehicle suddenly brakes.

The storing unit 150 may store information related to a system as well as the position information and the rotation information of the line-of-sight tracking camera 110 and the first and second stereo cameras 120 and 130.

Here, the position information and the rotation information of the line-of-sight tracking camera 110 and the first and second stereo cameras 120 and 130 may be recognized and stored through a previous physical measurement or information from software such as camera calibration, or the like.

Figure 2:
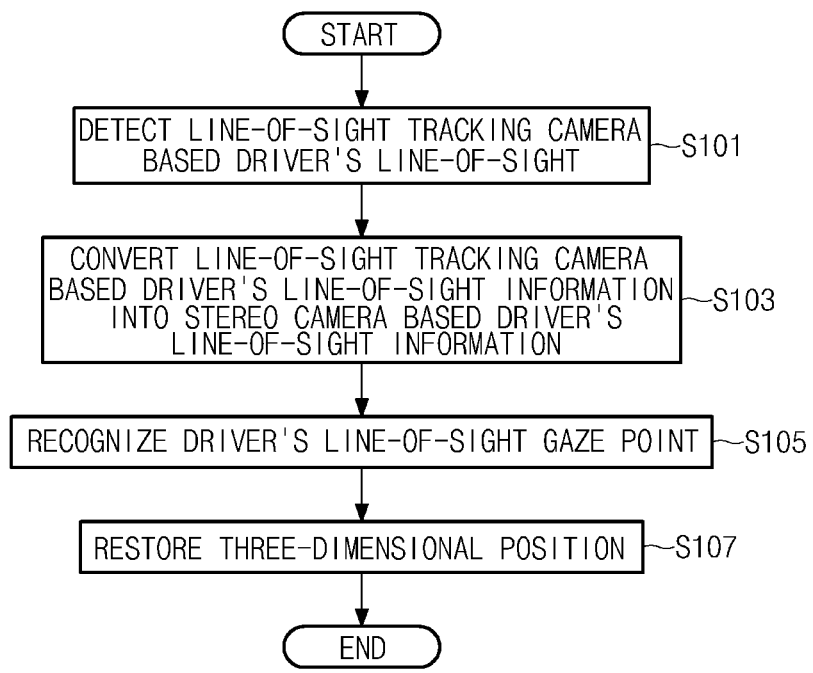
FIG. 2 is a flow chart for describing a display method according to an exemplary embodiment of the present inventive concept.

FIG. 2 is a flow chart for describing a display method according to an exemplary embodiment of the present inventive concept.

First, the display system 100 may detect an eyeball of a driver through the line-of-sight tracking camera 110 to recognize a line-of-sight tracking camera-based driver's line-of-sight information (S101).

Here, the line-of-sight tracking camera-based driver's line-of-sight information may include a line-of-sight tracking vector monocular eye point and a line-of-sight tracking vector.

Then, the display system may convert the line-of-sight tracking camera-based driver's line-of-sight information into first and second stereo camera-based driver's line-of-sight information based on pre-stored position information and rotation information of the line-of-sight tracking camera 110 and the first and second stereo cameras 120 and 130 (S103).

In this case, the display system 100 may convert the line-of-sight tracking camera-based line-of-sight tracking vector monocular eye point (Location) $(x_{loc}^{eye}, y_{loc}^{eye}, z_{loc}^{eye}, 1)$ into a stereo camera-based line-of-sight tracking vector monocular eye point $(x_{loc}^{global}, y_{loc}^{global}, z_{loc}^{global}, 1)$ through the above Equation 1.

In addition, the display system 100 may convert the line-of-sight tracking camera-based line-of-sight tracking vector $(x_{vec}^{eye}, y_{vec}^{eye}, z_{vec}^{eye}, 1)$ into a stereo camera-based line-of-sight tracking vector (rotation) $(x_{vec}^{global}, y_{vec}^{global}, z_{vec}^{global}, 1)$ through the above Equation 2.

Next, the display system 100 may recognize a driver's line-of-sight gaze point based on the first and second stereo camera-based driver's line-of-sight information (S105).

More specifically, the display system 100 may project the first and second stereo camera-based driver's line-of-sight information onto the first and second stereo cameras 120 and 130.

Next, the display system 100 may recognize a driver's line-of-sight gaze point based on the projection information onto the first and second stereo cameras 120 and 130.

This may be accomplished by a step of generating a window corresponding to a preset main gaze range of a person's line-of-sight on an image projected onto the first stereo camera 120, a step of moving a monocular eye point of the generated window according to a first stereo camera-based line-of-sight tracking vector, a step of performing template matching such that the moved window corresponds to a line-of-sight tracking vector of the second stereo camera 130, and a step of recognizing the highest position as a driver's line-of-sight gaze point as a result of the performing of the template matching.

For example, FIG. 4A shows a stereo camera-based line-of-sight tracking vector projected onto the first stereo camera 120. FIG. 4B shows a stereo camera-based line-of-sight tracking vector projected onto the second stereo camera 130.

Here, the display system 100 may move a monocular eye point of the window projected onto the first stereo camera 120 from ① to ③ through ② according to the first stereo camera-based line-of-sight tracking vector.

In addition, as shown in FIG. 4B, the display system 100 may perform the template matching such that the moved window corresponds to the line-of-sight tracking vector of the second stereo camera 130.

Next, the display system 100 may convert the driver's line-of-sight gaze point into a three-dimensional coordinate of the driver's line-of-sight (S107).

The three-dimensional coordinate of the driver's line-of-sight may be P(Xp, Yp, Zp), where $$X_p = x_1 \frac{T}{d}, Y_p = y_1 \frac{T}{d}, \text{ and } Z_p = f \frac{T}{x_1 - x_r}.$$

In addition, $P_1(x_1, y_1)$ may be a point at which P is projected onto an imaging surface of the first stereo camera. $P_r(x_r, y_r)$ may be a point at which P is projected onto an imaging surface of the second stereo camera. f may be a focal length of the camera. T may be a distance between the first and second stereo cameras. d may be a value obtained by dividing a distance of a coordinate measuring point by the focal distance of the camera.

With the display system and method according to an exemplary embodiment of the present inventive concept, since two-dimensional based driver's line-of-sight information is converted into three-dimensional based driver's line-of-sight information, a driver's line-of-sight direction having a more precise three-dimensional depth as compared with the related art may be detected.

In addition, with the display system and method according to an exemplary embodiment of the present inventive concept, since a three-dimensional line-of-sight focal length of the driver may be recognized, an object in an external environment may be easily and precisely judged, and information for recognizing the intention of the driver, or the like, may be variously utilized.

Although exemplary embodiments of the present inventive concept have been disclosed for illustrative purposes, it will be appreciated that the present inventive concept is not limited thereto, and those skilled in the art will appreciate that various modifications, additions and substitutions are possible, without departing from the scope and spirit of the inventive concept.

Accordingly, any and all modifications, variations or equivalent arrangements should be considered to be within the scope of the inventive concept, and the detailed scope of the inventive concept will be disclosed by the accompanying claims.

What is claimed is:

1. A display system, comprising:
   a line-of-sight tracking camera configured to detect an eyeball of a driver;
   first and second stereo cameras configured to photograph a range corresponding to a driver's field-of-view based on stereo camera-based driver's line-of-sight information that is changed based on line-of-sight tracking camera-based driver's line-of-sight information, and provide a photographed image;
   a controlling unit configured to convert the line-of-sight tracking camera-based driver's line-of-sight information into first and second stereo camera-based driver's line-of-sight information based on pre-stored position information and rotation information of the line-of-sight tracking camera and the first and second stereo cameras, and project the converted information onto the first and second stereo cameras, such that a three-dimensional coordinate of a driver's line-of-sight is calculated; and
   a storing unit configured to store information related to the display system as well as the position information and the rotation information of the line-of-sight tracking camera and the first and second stereo cameras.

2. The display system according to claim 1, wherein:
   the line-of-sight tracking camera-based driver's line-of-sight information includes a line-of-sight tracking vector monocular eye point and a line-of-sight tracking vector, and
   the controlling unit is configured to convert the line-of-sight tracking camera-based line-of-sight tracking vector monocular eye point into a stereo camera-based line-of-sight tracking vector monocular eye point.

3. The display system according to claim 2, wherein the controlling unit is configured to convert the line-of-sight tracking camera-based line-of-sight tracking vector monocular eye point (Location) ($x_{loc}^{eye}$, $y_{loc}^{eye}$, $z_{loc}^{eye}$, 1) into a stereo camera-based line-of-sight tracking vector monocular eye point ($x_{loc}^{global}$, $y_{loc}^{global}$, $z_{loc}^{global}$, 1) through the following Equation 1:

$$\text{Location} = \underbrace{\begin{bmatrix} 1 & 0 & 0 & t_{xyz}^{x} \\ 0 & 1 & 0 & t_{xyz}^{y} \\ 0 & 0 & 1 & t_{xyz}^{z} \\ 0 & 0 & 0 & 1 \end{bmatrix}}_{\text{Position Movement}} \underbrace{\begin{bmatrix} 1 & 0 & 0 & 0 \\ 0 & \cos\theta_x & -\sin\theta_x & 0 \\ 0 & \sin\theta_x & \cos\theta_x & 0 \\ 0 & 0 & 0 & 1 \end{bmatrix}}_{X \text{ axis rotation}}$$

$$\underbrace{\begin{bmatrix} \cos\theta_y & 0 & -\sin\theta_y & 0 \\ 0 & 1 & 0 & 0 \\ \sin\theta_y & 0 & \cos\theta_y & 0 \\ 0 & 0 & 0 & 1 \end{bmatrix}}_{Y \text{ axis rotation}} \underbrace{\begin{bmatrix} \cos\theta_z & -\sin\theta_z & 0 & 0 \\ \sin\theta_z & \cos\theta_z & 0 & 0 \\ 0 & 0 & 1 & 0 \\ 0 & 0 & 0 & 1 \end{bmatrix}}_{Z \text{ axis rotation}} \begin{bmatrix} x_{loc}^{eye} \\ y_{loc}^{eye} \\ z_{loc}^{eye} \\ 1 \end{bmatrix}$$

where $t_{xyz}^{x}$, $t_{xyz}^{y}$, and $t_{xyz}^{z}$ mean position information, and $\Theta_x$, $\Theta_y$, $\Theta_z$ mean rotation information.

4. The display system according to claim 1, wherein:

the line-of-sight tracking camera-based driver's line-of-sight information includes a line-of-sight tracking vector monocular eye point and a line-of-sight tracking vector, and the controlling unit is configured to convert the line-of-sight tracking camera-based line-of-sight tracking vector into a stereo camera-based line-of-sight tracking vector.

5. The display system according to claim 4, wherein the controlling unit is configured to convert the line-of-sight tracking camera-based line-of-sight tracking vector ($x_{vec}^{eye}$, $y_{vec}^{eye}$, $z_{vec}^{eye}$, 1) into a stereo camera-based line-of-sight tracking vector (Rotation) ($x_{vec}^{global}$, $y_{vec}^{global}$, $z_{vec}^{global}$, 1) through the following Equation 2:

$$\text{Rotation} = \underbrace{\begin{bmatrix} 1 & 0 & 0 & 0 \\ 0 & \cos\theta_x & -\sin\theta_x & 0 \\ 0 & \sin\theta_x & \cos\theta_x & 0 \\ 0 & 0 & 0 & 1 \end{bmatrix}}_{X \text{ axis rotation}}$$

$$\underbrace{\begin{bmatrix} \cos\theta_y & 0 & -\sin\theta_y & 0 \\ 0 & 1 & 0 & 0 \\ \sin\theta_y & 0 & \cos\theta_y & 0 \\ 0 & 0 & 0 & 1 \end{bmatrix}}_{Y \text{ axis rotation}} \underbrace{\begin{bmatrix} \cos\theta_z & -\sin\theta_z & 0 & 0 \\ \sin\theta_z & \cos\theta_z & 0 & 0 \\ 0 & 0 & 1 & 0 \\ 0 & 0 & 0 & 1 \end{bmatrix}}_{Z \text{ axis rotation}} \begin{bmatrix} x_{vec}^{eye} \\ y_{vec}^{eye} \\ z_{vec}^{eye} \\ 1 \end{bmatrix}$$

where $\Theta_x$, $\Theta_y$, $\Theta_z$ mean rotation information.

6. The display system according to claim 1, wherein the controlling unit is configured to calculate a driver's line-of-sight gaze point from a stereo camera-based line-of-sight tracking vector projected onto the first and second stereo cameras and calculate the three-dimensional coordinate of the driver's line-of-sight based on the calculated driver's line-of-sight gaze point.

7. The display system according to claim 6, wherein the controlling unit is configured to generate a window corresponding to a preset main gaze range of a person's line-of-sight on an image projected onto the first stereo camera, move a monocular eye point of the generated window according to a first stereo camera-based line-of-sight tracking vector, perform template matching such that the moved window corresponds to a line-of-sight tracking vector of the second stereo camera, and recognize a highest position as a driver's line-of-sight gaze point as a result of the performing the template matching.

8. The display system according to claim 1, wherein the three-dimensional coordinate of the driver's line-of-sight is P(Xp, Yp, Zp), $$X_p = x_1 \frac{T}{d}, \; Y_p = y_1 \frac{T}{d}, \text{ and } Z_p = f \frac{T}{x_1 - x_r},$$

where $P_l(x_1, y_1)$ is a point at which P is projected onto an imaging surface of the first stereo camera, $P_r(x_r, y_r)$ is a point at which P is projected onto an imaging surface of the second stereo camera, f is a focal length of the camera, T is a distance between the first and second stereo cameras, and d is a value obtained by dividing a distance of a coordinate measuring point by the focal length of the camera.

9. A display method providing a three-dimensional driver's line-of-sight in a display system including a line-of-sight tracking camera and first and second stereo cameras, the display method comprising:

detecting an eyeball of a driver through the line-of-sight tracking camera to recognize line-of-sight tracking camera-based driver's line-of-sight information;

converting the line-of-sight tracking camera-based driver's line-of-sight information into first and second stereo camera-based driver's line-of-sight information based on pre-stored position information and rotation information of the line-of-sight tracking camera and the first and second stereo cameras;

recognizing a driver's line-of-sight gaze point based on the first and second stereo camera-based driver's line-of-sight information; and converting the driver's line-of-sight gaze point into a three-dimensional coordinate of a driver's line-of-sight.

10. The display method according to claim 9, wherein:

the line-of-sight tracking camera-based driver's line-of-sight information includes a line-of-sight tracking vector monocular eye point and a line-of-sight tracking vector, and the converting of the line-of-sight tracking camera-based driver's line-of-sight information into the first and second stereo camera-based driver's line-of-sight information includes converting the line-of-sight tracking camera-based line-of-sight tracking vector monocular eye point into a stereo camera-based line-of-sight tracking vector monocular eye point.

11. The display method according to claim 10, wherein the converting of the line-of-sight tracking camera-based driver's line-of-sight information into the first and second stereo camera-based driver's line-of-sight information includes converting the line-of-sight tracking camera-based line-of-sight tracking vector monocular eye point (Location) ($x_{loc}^{eye}$, $y_{loc}^{eye}$, $z_{loc}^{eye}$, 1) into a stereo camera-based line-of-sight tracking vector monocular eye point ($x_{loc}^{global}$, $y_{loc}^{global}$, $z_{loc}^{global}$, 1) through the following Equation 1:

$$\text{Location} = \underbrace{\begin{bmatrix} 1 & 0 & 0 & t_{xyz}^x \\ 0 & 1 & 0 & t_{xyz}^y \\ 0 & 0 & 1 & t_{xyz}^z \\ 0 & 0 & 0 & 1 \end{bmatrix}}_{\text{Position Movement}} \underbrace{\begin{bmatrix} 1 & 0 & 0 & 0 \\ 0 & \cos\theta_x & -\sin\theta_x & 0 \\ 0 & \sin\theta_x & \cos\theta_x & 0 \\ 0 & 0 & 0 & 1 \end{bmatrix}}_{X \text{ axis rotation}}$$

$$\underbrace{\begin{bmatrix} \cos\theta_y & 0 & -\sin\theta_y & 0 \\ 0 & 1 & 0 & 0 \\ \sin\theta_y & 0 & \cos\theta_y & 0 \\ 0 & 0 & 0 & 1 \end{bmatrix}}_{Y \text{ axis rotation}} \underbrace{\begin{bmatrix} \cos\theta_z & -\sin\theta_z & 0 & 0 \\ \sin\theta_z & \cos\theta_z & 0 & 0 \\ 0 & 0 & 1 & 0 \\ 0 & 0 & 0 & 1 \end{bmatrix}}_{Z \text{ axis rotation}} \begin{bmatrix} x_{loc}^{eye} \\ y_{loc}^{eye} \\ z_{loc}^{eye} \\ 1 \end{bmatrix}$$

where $t_{xyz}^x$, $t_{xyz}^y$, and $t_{xyz}^z$ mean position information, and $\Theta_x$, $\Theta_y$, $\Theta_z$ mean rotation information.

12. The display method according to claim 9, wherein:

the line-of-sight tracking camera-based driver's line-of-sight information includes a line-of-sight tracking vector monocular eye point and a line-of-sight tracking vector, and the converting of the line-of-sight tracking camera-based driver's line-of-sight information into the first and second stereo camera-based driver's line-of-sight information includes converting the line-of-sight tracking camera-based line-of-sight tracking vector into a stereo camera-based line-of-sight tracking vector.

13. The display method according to claim 12, wherein the converting of the line-of-sight tracking camera-based driver's line-of-sight information into the first and second stereo camera-based driver's line-of-sight information includes converting the line-of-sight tracking camera-based line-of-sight tracking vector ($x_{vec}^{eye}$, $y_{vec}^{eye}$, $z_{vec}^{eye}$, 1) into a stereo camera-based line-of-sight tracking vector (Rotation) ($x_{vec}^{global}$, $y_{vec}^{global}$, $z_{vec}^{global}$, 1) through the following Equation 2:

$$\text{Rotation} = \underbrace{\begin{bmatrix} 1 & 0 & 0 & 0 \\ 0 & \cos\theta_x & -\sin\theta_x & 0 \\ 0 & \sin\theta_x & \cos\theta_x & 0 \\ 0 & 0 & 0 & 1 \end{bmatrix}}_{X \text{ axis rotation}}$$

$$\underbrace{\begin{bmatrix} \cos\theta_y & 0 & -\sin\theta_y & 0 \\ 0 & 1 & 0 & 0 \\ \sin\theta_y & 0 & \cos\theta_y & 0 \\ 0 & 0 & 0 & 1 \end{bmatrix}}_{Y \text{ axis rotation}} \underbrace{\begin{bmatrix} \cos\theta_z & -\sin\theta_z & 0 & 0 \\ \sin\theta_z & \cos\theta_z & 0 & 0 \\ 0 & 0 & 1 & 0 \\ 0 & 0 & 0 & 1 \end{bmatrix}}_{Z \text{ axis rotation}} \begin{bmatrix} x_{vec}^{eye} \\ y_{vec}^{eye} \\ z_{vec}^{eye} \\ 1 \end{bmatrix}$$

where $\Theta_x$, $\Theta_y$, $\Theta_z$ mean rotation information.

14. The display method according to claim 9, wherein the recognizing of the driver's line-of-sight gaze point includes:

projecting the first and second stereo camera-based driver's line-of-sight information onto the first and second stereo cameras; and recognizing the driver's line-of-sight gaze point based on the information projected onto the first and second stereo cameras.

15. The display method according to claim 14, wherein the recognizing of the driver's line-of-sight gaze point based on the information projected onto the first and second stereo cameras includes:

generating a window corresponding to a preset main gaze range of a person's line-of-sight on an image projected onto the first stereo camera;

moving a monocular eye point of the generated window according to a first stereo camera-based line-of-sight tracking vector;

performing template matching such that the moved window corresponds to a line-of-sight tracking vector of the second stereo camera; and recognizing a highest position as a driver's line-of-sight gaze point as a result of the performance.

16. The display method according to claim 14, wherein the three-dimensional coordinate of the driver's line-of-sight is P(Xp, Yp, Zp), $$X_p = x_1 \frac{T}{d}, \; Y_p = y_1 \frac{T}{d}, \text{ and } Z_p = f \frac{T}{x_1 - x_r},$$

where $P_l(x_l, y_l)$ is a point at which P is projected onto an imaging surface of the first stereo camera, $P_r(x_r, y_r)$ is a point at which P is projected onto an imaging surface of the second stereo camera, f is a focal length of the camera, T is a distance between the first and second stereo cameras, and d is a value obtained by dividing a distance of a coordinate measuring point by the focal length of the camera.

* * * * *